No. 614,900. Patented Nov. 29, 1898.
A. SEAVER & G. A. CHAMBERLIN.
VELOCIPEDE PEDAL.
(Application filed Sept. 9, 1897.)
(No Model.)
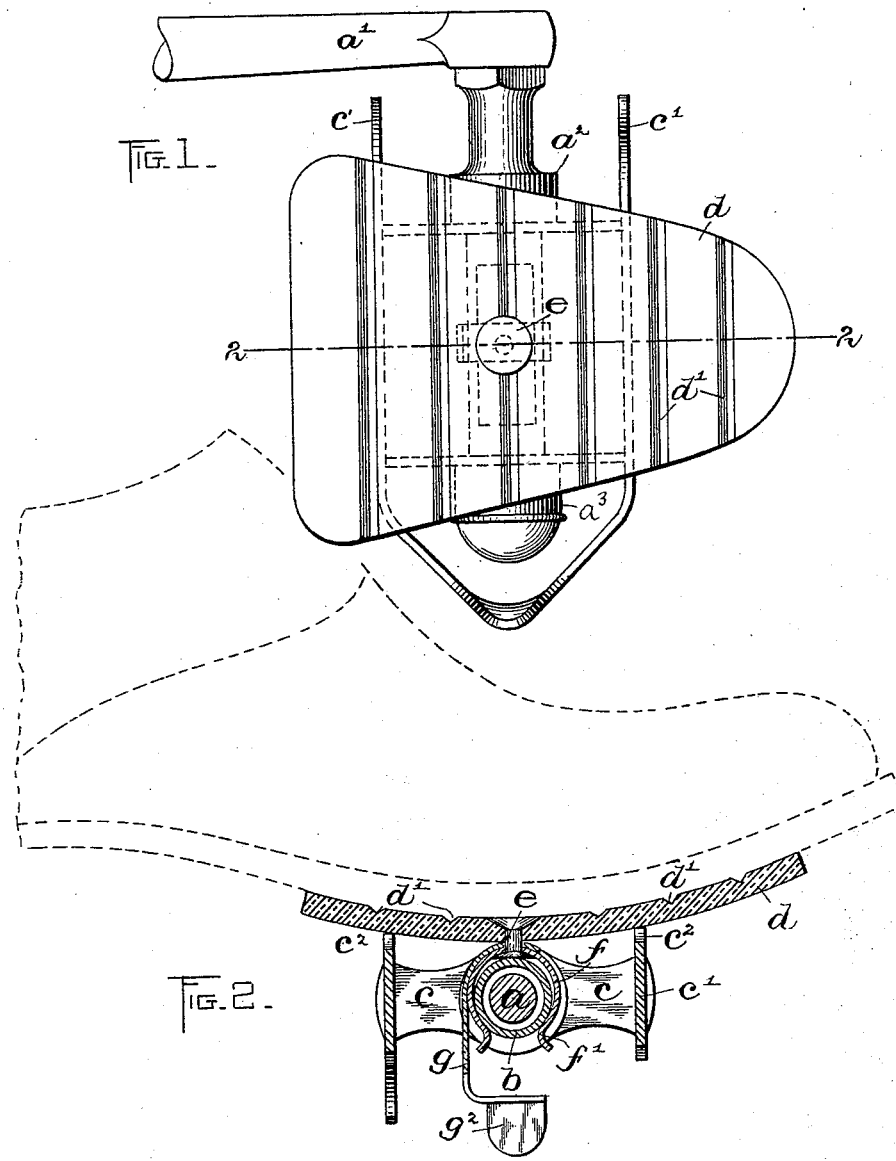
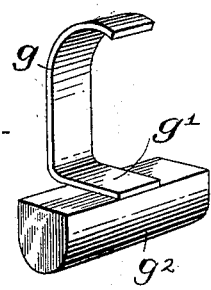
WITNESSES:
INVENTORS

UNITED STATES PATENT OFFICE.

AUGUSTUS SEAVER, OF BOSTON, AND GEORGE A. CHAMBERLIN, OF NORTH ABINGTON, MASSACHUSETTS, ASSIGNORS TO CHARLES F. BROWN, TRUSTEE, OF READING, MASSACHUSETTS.

VELOCIPEDE-PEDAL.

SPECIFICATION forming part of Letters Patent No. 614,900, dated November 29, 1898.

Application filed September 9, 1897. Serial No. 651,055. (No model.)

*To all whom it may concern:*

Be it known that we, AUGUSTUS SEAVER, of Boston, in the county of Suffolk, and GEORGE A. CHAMBERLIN, of North Abington, in the county of Plymouth, State of Massachusetts, have invented certain new and useful Improvements in Velocipede-Pedals, of which the following is a specification.

This invention has relation to pedals for bicycles and other like vehicles, and has for its object to provide an attachment for a pedal which may be easily secured thereto and removed therefrom and which will operate to prevent the foot from slipping from the pedal when the bicycle is in motion and to protect the soles of the rider's shoes from injury by contact with the sharp-edged bars of the pedal.

Another object of the invention is to provide an attachment of the character described which will be provided with an adjustable weight whereby the attachment will be always in position to receive the foot.

The manner in which these objects are obtained and in what the invention consists will be fully described in the accompanying specification and pointed out in the claims, reference being had to the accompanying drawings, which portray one form of the invention which has been selected for the purpose of illustration.

Letters of reference upon the drawings indicate like parts or features, as the case may be, wherever they occur.

Of the drawings, Figure 1 represents in plan view a pedal equipped with our invention. Fig. 2 represents a longitudinal section of the same on the line 2 2 of Fg. 1. Fig. 3 represents the adjustable weight forming a part of the attachment. Fig. 4 represents a perspective view of the clip for detachably securing an attachment upon the pedal.

We have elected to show our invention as applied to the so-called "rat-trap" pedal, comprising a sleeve $b$, fitted to rotate on the stationary spindle $a$, which is rigidly secured to the crank $a'$, cross-bars $c$, extending from the sleeve, and longitudinal bars or plates $c'$ $c'$, attached to the cross-bars. Ordinarily the upper edges $c^2$ of the said longitudinal bars are serrated to engage the sole of the shoe and prevent the foot from slipping, and between the sleeve and the spindle are antifrictional devices, so that the said pedal is mounted on antifriction-bearings.

Our invention consists of a pad $d$ of suitable material—such as leather, rubber, or the like—having a frictional surface and preferably shaped approximately like the sole of a shoe, as shown in Fig. 1. To increase the frictional resistance, the pad is formed with grooves or notches $d'$ on its upper surface; but the said surface may be roughened in any other way desired. The pad rests upon and is supported by the longitudinal bars $c'$ $c'$ of the pedal and is slightly curved to conform to the shape of the shoe. It projects beyond the said bars $c'$, so as to afford a firm support and bearing for the boot.

Beneath the pad and secured thereto by a rivet $e$ is a clip $f$, formed of spring metal, adapted to be slipped over the sleeve $b$, as shown in Fig. 2. The ends of the clip are preferably bent outwardly, as shown at $f'$, to aid in securing it upon the sleeve or central portion of the pedal. The said rivet $e$ also secures to the pad and the clip a bar $g$, having its upper end curved to conform to the shape of the clip and having its lower end $g'$ bent at an angle to the body thereof, and to which is secured a counterweight $g^2$. The said bar $g$ is more or less ductile, so that it may be bent, as desired, to properly balance the pedal and hold it with the pad uppermost to receive the foot.

An attachment constructed in accordance with the above description may be easily attached to or detached from a pedal of almost any type, kind, or size, and affords a roughened bearing to receive the foot, thereby obviating the necessity of employing a toe-clip and protecting the sole of the rider's shoe against injury from the sharp edges of the longitudinal bars of the pedal.

The pads may be made of different sizes and shapes and of any material that will present a roughened or frictional surface to the sole of the shoe.

It will be seen that the pad formed to bear simultaneously on the two longitudinal bars of a rat-trap pedal protects the shoe-sole from injury by either bar, and is therefore an equivalent of two separate attachments, one for each. The construction is, however, much cheaper and simpler, the entire protector for both bars being made in a single piece and secured to the pedal by a single attaching device.

The pad is flexible, so that when applied to the pedal it assumes a curvature conforming to the sole of the rider's shoe, as shown in Fig. 2.

Having thus explained the nature of our invention and described a way of constructing and using the same, though without attempting to set forth all of the forms in which it may be made or all of the modes of its use, what we claim, and desire to secure by Letters Patent, is—

1. An attachment for bicycle-pedals, comprising a flexible pad formed to bear simultaneously on the upper edges of the longitudinal bars or plates of a rat-trap pedal and to extend across the space between said bars, said plate having a frictional upper surface which is caused by the flexibility of the pad to conform to the curvature of the sole of the rider's shoe, and an attaching device projecting downwardly from its lower surface for engagement with the pedal.

2. An attachment for bicycle-pedals, comprising a pad having an enlarged frictional bearing-surface, and resting upon, and extending entirely across a bicycle-pedal, a device for securing said pad to the pedal, and a counterweight for holding said pad with its bearing-surface in position to receive the shoe of the rider, said securing device and counterweight being fastened to the pad by a single attaching device.

In testimony whereof we have signed our names to this specification, in the presence of two subscribing witnesses, this 4th day of September, A. D. 1897.

AUGUSTUS SEAVER.
GEORGE A. CHAMBERLIN.

Witnesses:
C. F. BROWN,
E. BATCHELDER.